(12) United States Patent
Faruque et al.

(10) Patent No.: US 11,007,958 B2
(45) Date of Patent: May 18, 2021

(54) CROSS-VEHICLE PIVOTING STEERING ASSEMBLY

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 16/386,979

(22) Filed: Apr. 17, 2019

(65) Prior Publication Data

US 2020/0331414 A1   Oct. 22, 2020

(51) Int. Cl.
| | |
|---|---|
| *B60R 21/01* | (2006.01) |
| *B62D 1/19* | (2006.01) |
| *B62D 1/18* | (2006.01) |
| *B60R 21/013* | (2006.01) |
| *B62D 1/185* | (2006.01) |
| B60R 21/203 | (2006.01) |
| B60R 21/00 | (2006.01) |

(52) U.S. Cl.
CPC ............ *B60R 21/013* (2013.01); *B62D 1/185* (2013.01); *B62D 1/192* (2013.01); *B60R 21/203* (2013.01); *B60R 2021/0009* (2013.01)

(58) Field of Classification Search
CPC ................ B60R 21/013; B60R 21/203; B60R 2021/0009; B62D 1/192; B62D 1/185
See application file for complete search history.

(56) References Cited

U.S. PATENT DOCUMENTS

| | | | |
|---|---|---|---|
| 3,424,263 A | 1/1969 | Black | |
| 3,477,307 A | 11/1969 | Maddox | |
| 3,893,348 A * | 7/1975 | Rieth | B62D 1/11 |
| | | | 74/492 |
| 4,185,880 A * | 1/1980 | Shiomi | B62D 1/16 |
| | | | 384/498 |
| 4,746,144 A | 5/1988 | Kulczyk | |
| 4,915,412 A | 4/1990 | Yuzuriha et al. | |
| 4,990,021 A * | 2/1991 | Olgren | B62D 1/184 |
| | | | 403/24 |
| 5,503,431 A | 4/1996 | Yamamoto | |
| 5,507,521 A * | 4/1996 | Steffens, Jr. | B60R 21/203 |
| | | | 180/282 |
| 5,613,709 A * | 3/1997 | Nakamichi | B62D 1/197 |
| | | | 180/232 |
| 6,655,716 B2 | 12/2003 | Riefe | |
| 7,497,470 B2 | 3/2009 | Streng et al. | |

(Continued)

FOREIGN PATENT DOCUMENTS

| | | |
|---|---|---|
| GB | 2482161 A | 1/2012 |
| WO | 9012722 A1 | 11/1990 |

*Primary Examiner* — Rodney A Butler
(74) *Attorney, Agent, or Firm* — Frank A. MacKenzie; Bejin Bieneman PLC

(57) ABSTRACT

An assembly for a vehicle includes an upper steering shaft and a lower steering shaft. A pivot joint is between the upper steering shaft and the lower steering shaft. The upper steering shaft is pivotable in a cross-vehicle direction about the pivot joint. A pin is connected to the upper steering shaft and the lower steering shaft. The pin is releasable from at least one of the upper steering shaft and the lower steering shaft.

20 Claims, 8 Drawing Sheets

(56) References Cited

U.S. PATENT DOCUMENTS

| | | | | |
|---|---|---|---|---|
| 8,517,142 B1* | 8/2013 | Farrar | ................ | B62K 5/08 |
| | | | | 180/444 |
| 2003/0067216 A1* | 4/2003 | Nagae | ............. | B60R 25/02153 |
| | | | | 303/89 |
| 2006/0150763 A1* | 7/2006 | Raabe | ................ | B62D 1/192 |
| | | | | 74/492 |
| 2007/0029771 A1* | 2/2007 | Haglund | ............. | B62D 1/197 |
| | | | | 280/775 |
| 2008/0023236 A1* | 1/2008 | Falkiner | ............. | A63B 55/57 |
| | | | | 180/65.1 |
| 2010/0242665 A1* | 9/2010 | Nagamura | ......... | B60R 25/0211 |
| | | | | 74/493 |
| 2017/0334383 A1* | 11/2017 | Paxton | ............. | B60R 21/0136 |
| 2020/0023883 A1* | 1/2020 | Davies | ................ | B62D 1/184 |

\* cited by examiner

CROSS-VEHICLE PIVOTING STEERING ASSEMBLY

BACKGROUND

A steering system for a vehicle controls a steering angle of wheels of the vehicle. The steering system assists in moving the wheels in response to an operator input to a steering wheel of the vehicle. The steering system may include an upper steering shaft and a lower steering shaft connected to one another with a steering wheel mounted to the upper shaft. The lower steering shaft is connected to a steering unit, e.g., a rack-and-pinion unit, that converts rotational movement of the lower steering shaft into translational movement to steer the wheels.

DETAILED DESCRIPTION

Figure 1A:
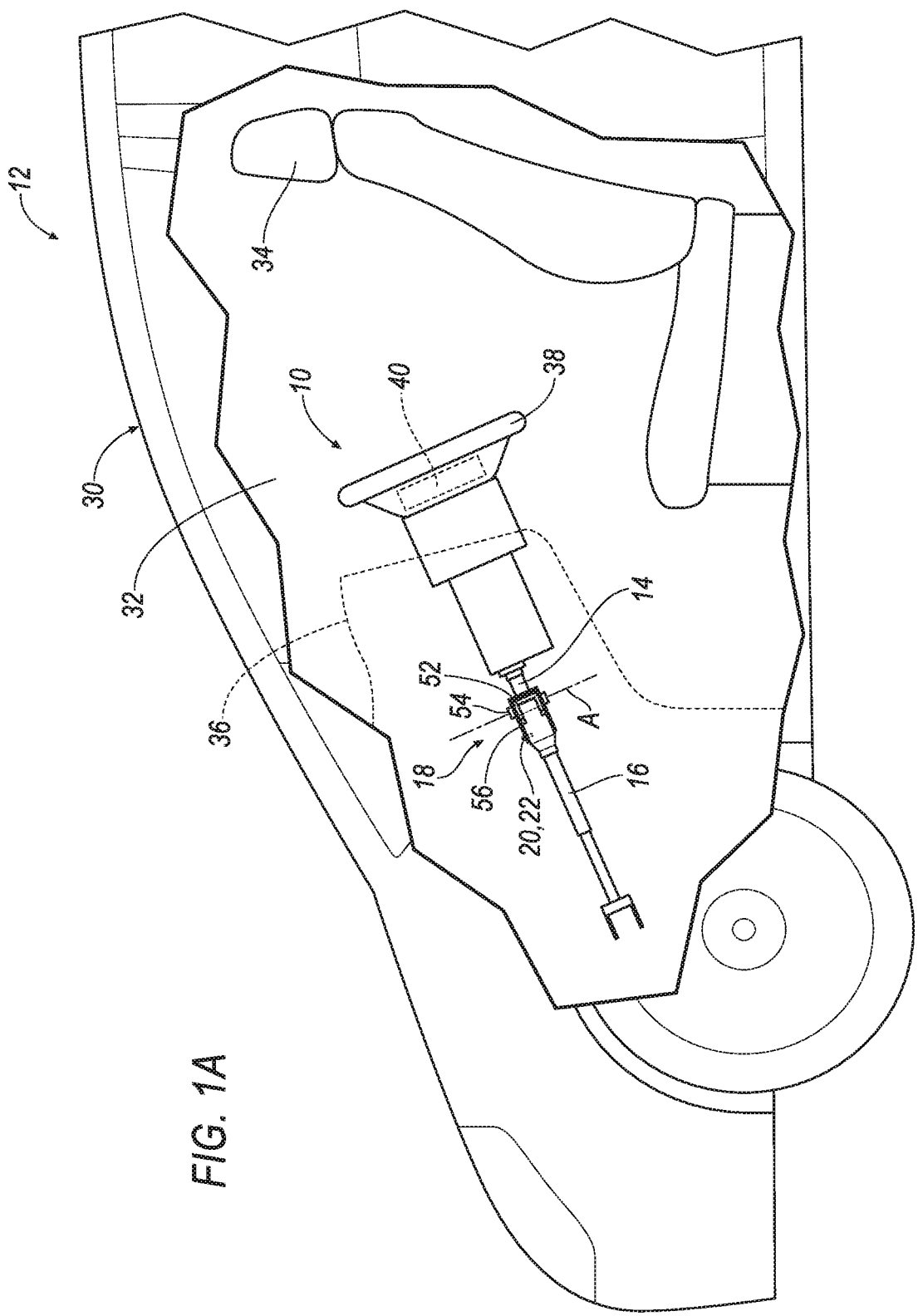
FIG. 1A is a side view of a vehicle including an assembly for steering the vehicle.

An assembly includes an upper steering shaft and a lower steering shaft. The assembly includes a pivot joint between the upper steering shaft and the lower steering shaft with the upper steering shaft being pivotable in a cross-vehicle direction about the pivot joint. The assembly includes a pin connected to the upper steering shaft and the lower steering shaft and releasable from at least one of the upper steering shaft and the lower steering shaft.

The pivot joint may be pivotable about an axis that is generally vertical.

The pin may be spaced from the pivot joint.

The pivot joint may be pivotable about an axis. The pin may be designed to release from at least one of the upper steering shaft and the lower steering shaft when the axis is generally vertical and during a vehicle-oblique impact.

The upper steering shaft may be pivotable about the pivot joint relative to the lower steering shaft in the cross-vehicle direction toward the vehicle-oblique impact.

The assembly may include an airbag deployable to an inflated position. The upper steering shaft may be pivotable relative to the lower steering shaft about the pivot joint concurrently with the airbag deploying to the inflated position.

The upper steering shaft may be telescopic.

The pin may be frangible relative to at least one of the upper steering shaft and the lower steering shaft.

The pivot joint may pivotable about an axis. The pin may be designed to release from at least one of the upper steering shaft and the lower steering shaft when the axis is generally vertical.

The pin may be designed to remain connected to the upper steering shaft and the lower steering shaft when the axis is offset from generally vertical.

The assembly may include a steering wheel connected to the upper steering shaft. The axis may be generally vertical when the steering wheel is generally in a center position and the axis being offset from generally vertical when the steering wheel is generally offset from the center position.

The assembly may include a steering wheel connected to the upper steering shaft, the axis being generally vertical when the steering wheel is generally in a center position.

The assembly may include an active release including the pin. The assembly may include a computer comprising a processor and a memory storing instructions executable by the processor to retract the pin of the active release at least in response to a vehicle-oblique impact.

The assembly may include a solenoid including the pin.

The assembly may include a computer comprising a processor and a memory storing instructions executable by the processor to retract the pin of the solenoid at least in response to a vehicle-oblique impact.

The instructions may include instructions to retract the pin of the solenoid at least in response to detection of a steering wheel generally in a center position.

The assembly may include a pyrotechnic device including the pin.

The assembly may include a computer comprising a processor and a memory storing instructions executable by the processor to release the pin of the pyrotechnic device at least in response to a vehicle-oblique impact.

The instructions may include instructions to release the pin of the pyrotechnic device at least in response to detection of a steering wheel generally in a center position.

With reference to the Figures, wherein like numerals indicate like parts throughout the several views, an assembly 10 for a vehicle 12 includes an upper steering shaft 14 and a lower steering shaft 16. A pivot joint 18 is between the upper steering shaft 14 and the lower steering shaft 16. The upper steering shaft 14 is pivotable in a cross-vehicle direction about the pivot joint 18. A pin 20 is connected to the upper steering shaft 14 and the lower steering shaft 16. The pin 20 is releasable from at least one of the upper steering shaft 14 and the lower steering shaft 16.

The connection of the pin 20 to the upper steering shaft 14 and the lower steering shaft 16 prevents rotation of the upper steering shaft 14 relative to the lower steering shaft 16 about the pivot joint 18. In the event of a vehicle-oblique impact, the release of the pin 20 allows the upper steering shaft 14 to rotate in the cross-vehicle direction. The relative rotation of the upper steering shaft 14 can encourage an airbag 42 (described further below) supported on the upper steering wheel to move with the head of the occupant during the vehicle-oblique impact. A vehicle-oblique impact is an impact that urges the occupant to move forward and cross-vehicle, e.g., the National Highway Traffic Safety Administration oblique offset moving deformable barrier impact test, small offset rigid barrier test, etc.

Figure 3:
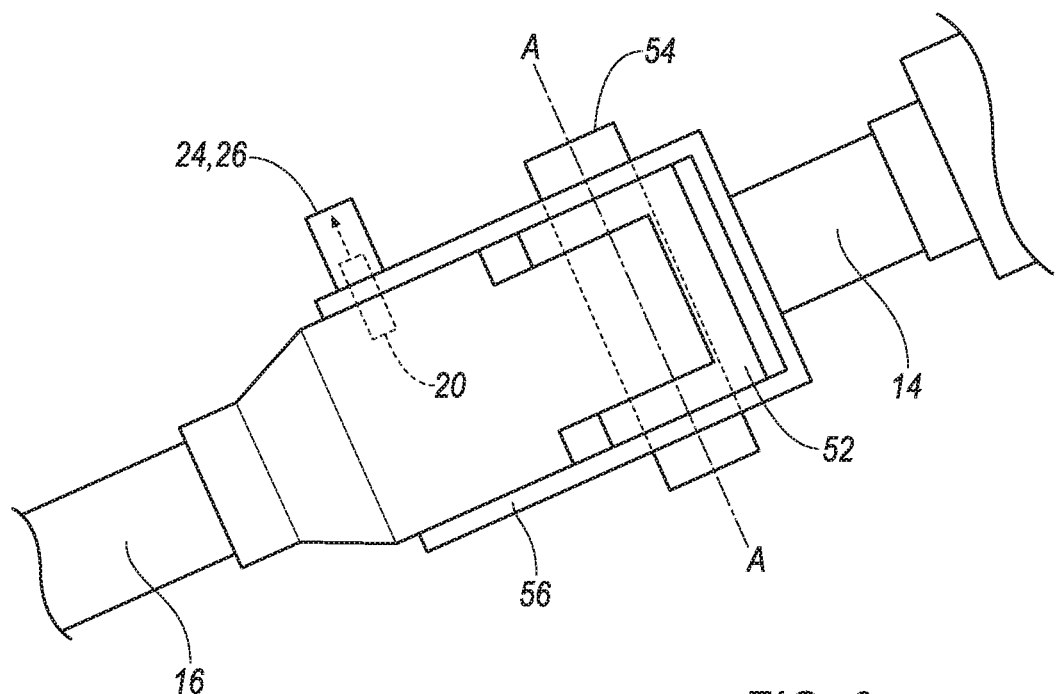
FIG. 3 is a side view of another embodiment of the assembly with the pivot joint including a solenoid to release the pin.
Figure 4:
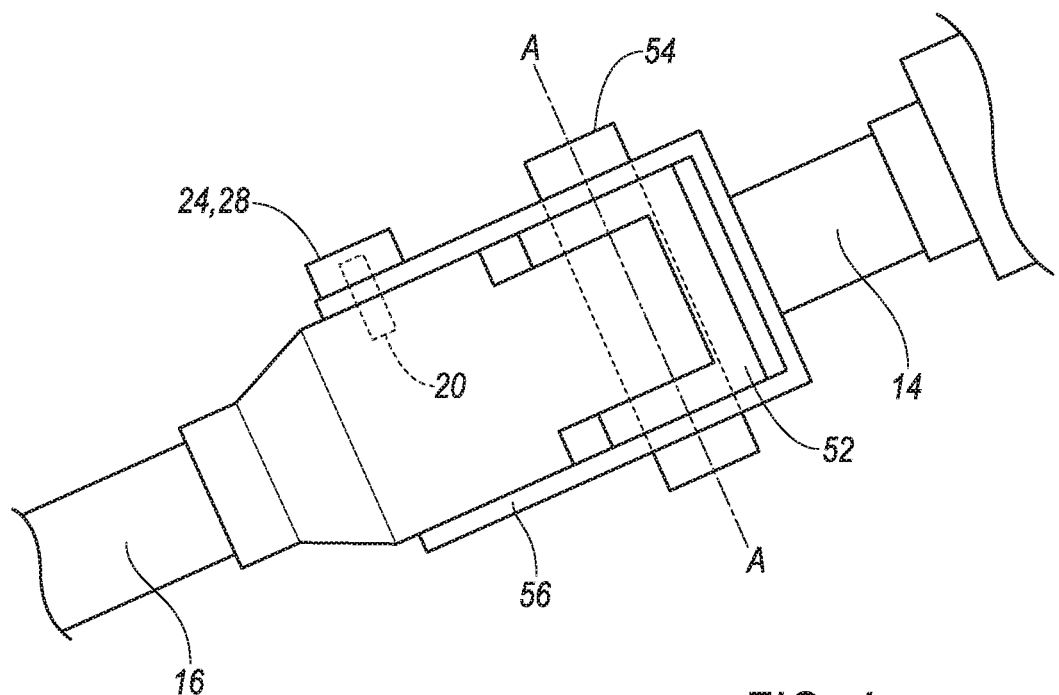
FIG. 4 is a side view of another embodiment of the assembly with the pivot joint including a pyrotechnic device to release the pin.

Three examples of release of the pin 20 are described below and the pin 20 may be released in any suitable way. In one example, as shown in FIGS. 1A-2B, the pin 20 is frangible relative to at least one of the upper steering shaft 14 and the lower steering shaft 16 and releases by breaking when force applied to the upper steering shaft 14 exceeds a threshold. In other words, the pin 20 in FIGS. 1A-2B is a shear pin 22. As another example, the pin 20 may be a component of an active release 24 that actively releases the pin 20, e.g., in response to an instruction from a computer 50. For example, as shown in FIG. 3, the pin 20 may be a component of a solenoid 26 and releases when components of the solenoid 26 retract the pin 20 from engagement with the lower steering shaft 16. As another example, as shown in FIG. 4, the pin 20 may be a component of a pyrotechnic device 28 and releases when components of the pyrotechnic device 28 discharges.

With reference to FIG. 1A, the vehicle 12 includes a body 30. The body 30 defines a passenger compartment 32 to house occupants, if any, of the vehicle 12.

The vehicle 12 may include one or more seats 34 disposed in the passenger compartment 32. The vehicle 12 may include any suitable number of seats 34 in any suitable position, e.g., front seats, back seats, left side, right side, etc. The position and orientation of the seats 34 and components thereof may be adjustable. As shown in FIG. 1A, the vehicle 12 may include front seats 34 facing a forward end of the passenger compartment 32. Specifically, the vehicle 12 may include a driver seat 34 facing the assembly 10.

An instrument panel 36 may be disposed at the forward end of the passenger compartment 32 and face toward the front seats 34. The instrument panel 36 may be supported by the body 30. The instrument panel 36 may include vehicle controls, e.g., radio controls, climate control buttons, vehicle cluster, etc.

The assembly 10 may be supported by the instrument panel 36. For example, the lower steering shaft 16 may be supported by the instrument panel 36 and/or the body 30 by brackets (not shown). Bearings may be disposed between the brackets and the lower steering shaft 16 to allow relative rotation therebetween. The assembly 10 extends outwardly from the instrument panel 36 toward the front seats 34. The assembly 10 allows an operator of the vehicle 12 steer the vehicle 12.

The vehicle 12 may include a steering system for steering the vehicle 12. The steering system includes the assembly 10 and other components between the assembly 10 and wheels of the vehicle 12 for steering the wheels, e.g., rack-and-pinion components, steer-by-wire, etc.

With continued reference to FIG. 1A, the assembly 10 includes a steering wheel 38. The steering wheel 38 is connected, i.e., directly or indirectly, to the upper steering shaft 14. The steering wheel 38 allows the operator to steer the vehicle 12 by transmitting rotation of the steering wheel 38 to the wheels of the vehicle 12, e.g., by a rack-and-pinion system, steer-by-wire system, etc. The steering wheel 38 may be, e.g., a rigid ring fixedly attached to the upper steering shaft 14.

The steering wheel 38 is rotatable between a center position and positions offset from the center position, e.g., in 360 degrees. When the steering wheel 38 is generally in the center position, the wheels of the vehicle 12 are straight such that the vehicle 12, when on a flat surface, travels in a generally straight line (with "generally" accounting for minor vagaries in the steering system including alignment, wheel condition, etc.).

The vehicle 12 includes an airbag assembly 40 mounted to the steering wheel 38. The airbag assembly 40 may be disposed on and attached to the steering wheel 38 near a center of the steering wheel 38.

Figure 5A:
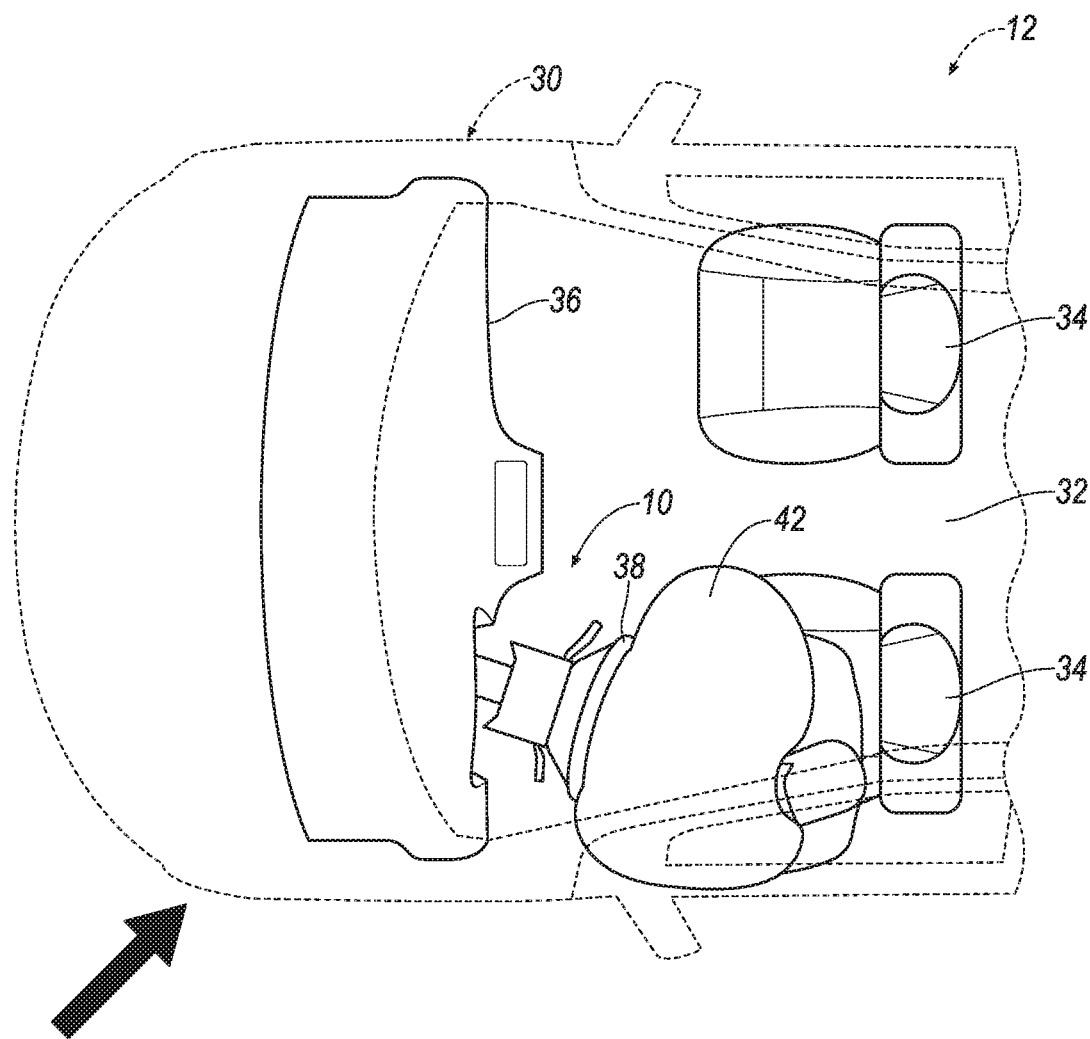
FIG. 5A is a top view of the vehicle with the assembly pivoted toward a left side vehicle-oblique impact.
Figure 5B:
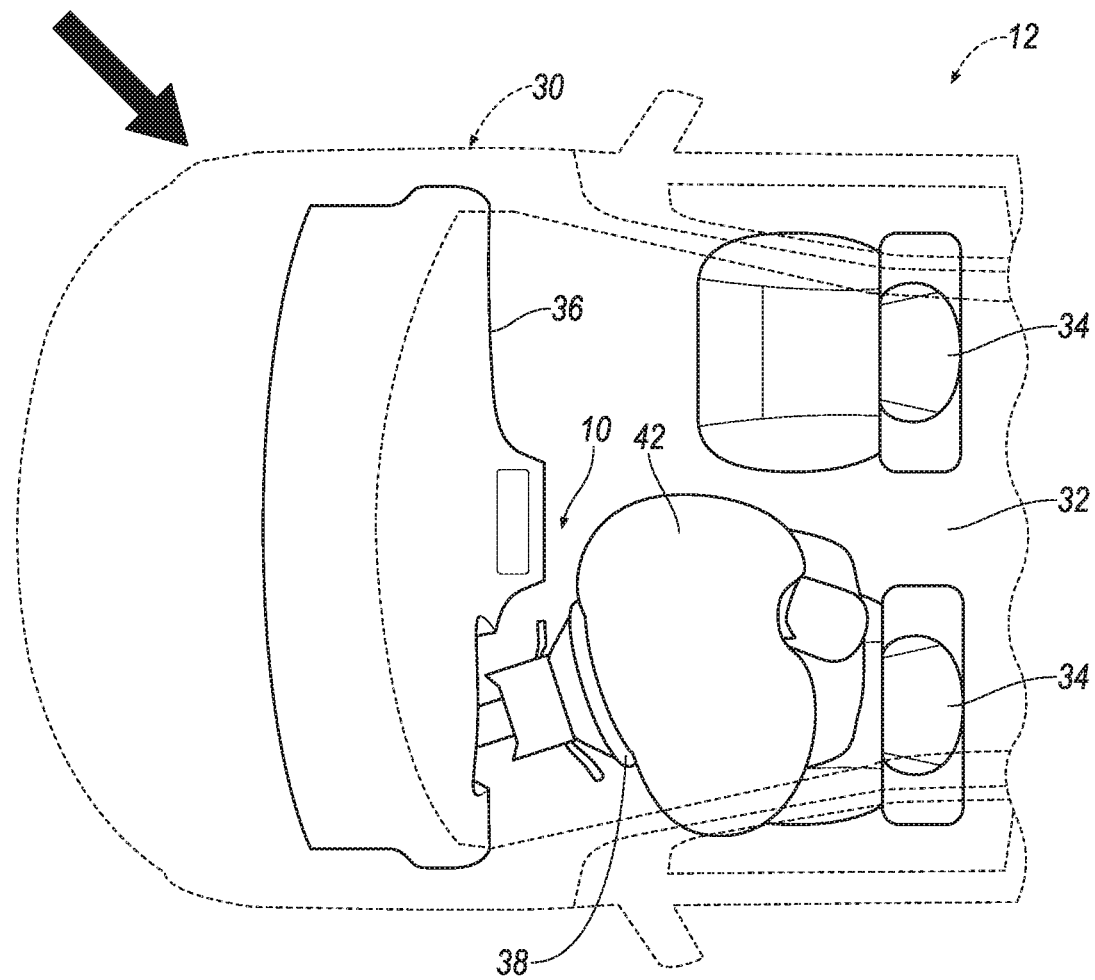
FIG. 5B is a top view of the vehicle with the assembly pivoted toward a right side vehicle-oblique impact.

The airbag assembly 40 includes an airbag 42 and an inflator 44 in fluid communication with the airbag 42 to inflate the airbag 42. The airbag 42 is deployable from an uninflated position (FIG. 1A) to an inflated position (FIGS. 5A-5B).

The airbag 42 may be formed of a woven polymer or any other material. As one example, the airbag 42 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 44 may be connected to the airbag 42. Upon receiving a signal from, e.g., the vehicle controller, the inflator 44 may inflate the airbag 42 with an inflatable medium, such as a gas. The inflator 44 may be, for example, a pyrotechnic inflator that uses a chemical reaction to drive inflation medium to the airbag 42. The inflator 44 may be of any suitable type, for example, a cold-gas inflator.

The vehicle 12 may include an impact sensor 46. In the event of an impact, the impact sensor 46 may detect the impact and transmit a signal through a communication network 48 to the computer 50. The computer 50 may transmit a signal through the communication network 48 of the vehicle 12 to the inflator 44 of the airbag assembly 40 to instruct the inflator 44 to discharge and inflate the airbag 42. The vehicle 12 may include any suitable number of impact sensors 46 to detect any number of impacts to the vehicle 12, e.g., vehicle-oblique impact, vehicle-frontal impact, vehicle-rear impact, vehicle-side impact, etc.

The assembly 10 includes the upper steering shaft 14 and the lower steering shaft 16 connected to the upper steering shaft 14. The upper steering shaft 14 may be telescopic, i.e., an operator of the vehicle 12 may move the steering wheel 38 toward or away from the instrument panel 36 telescopically to position the steering wheel 38 in a desired operating position. For example, the upper steering shaft 14 may include a lower portion connected to the lower steering shaft 16 and an upper portion connected to the steering wheel 38. The upper portion may telescope relative to the upper portion to allow for telescopic adjustment of the steering wheel 38.

With reference to FIGS. 1A-4, the pivot joint 18 is between the upper steering shaft 14 and the lower steering shaft 16. The upper steering shaft 14 is pivotable about the pivot joint 18 relative to the lower steering shaft 16, i.e., when the pin 20 is released. Specifically, the pivot joint 18 is pivotable about an axis A. The axis A changes position as the steering wheel 38 is rotated. The axis A is generally vertical when the steering wheel 38 is generally in the center position. Accordingly, when the steering wheel 38 is generally in the center position, the upper steering shaft 14 is pivotable about the axis A in the cross-vehicle direction of the vehicle 12. The axis A is offset from generally vertical when the steering wheel 38 is generally offset from the center position, e.g., when the steering wheel 38 is rotated. As set forth further below, the assembly 10 may be designed such that, when the pin 20 is released from the lower steering shaft 16, the upper steering shaft 14 is only pivotable about the axis A when the steering wheel 38 is generally in the center position.

With continued reference to FIGS. 1A-4, the pivot joint 18 may include a bushing 52 and a pivot pin 54. The bushing 52 may be on one of the upper steering shaft 14 and the lower steering shaft 16 and the pivot pin 54 pins the bushing 52 to the other of the upper steering shaft 14 and the lower steering shaft 16. In the example shown in the Figures, the bushing 52 is on the lower steering shaft 16 and the pivot pin 54 extends through the upper steering shaft 14. The pivot pin 54 is pivotally coupled with the bushing 52, i.e., allowing the pivot joint 18 to pivot when the pin 20 is released. In the alternative to or in addition to the bushing 52 and pivot joint 18, the pivot joint 18 may be of any suitable type.

One of the upper steering shaft 14 and the lower steering shaft 16 includes a bracket 56 pinned to the bushing 52 with the pivot pin 54. In the example shown in the Figures, the bracket 56 is on the upper steering shaft 14 opposite the steering wheel 38. The bracket 56 interlocks with the bushing 52 with the pivot pin 54. The bracket 56 may be of a general U-shape, i.e., the bracket 56 extends from one side of the bushing 52 and around the bushing 52 to the opposite side of the bushing 52. The bracket 56 may be of any suitable shape to interlock with the bushing 52. When the steering wheel 38 is rotated to turn the wheels of the vehicle 12, the upper steering shaft 14, the lower steering shaft 16, and the pivot joint 18 rotate as a unit.

Figure 1B:
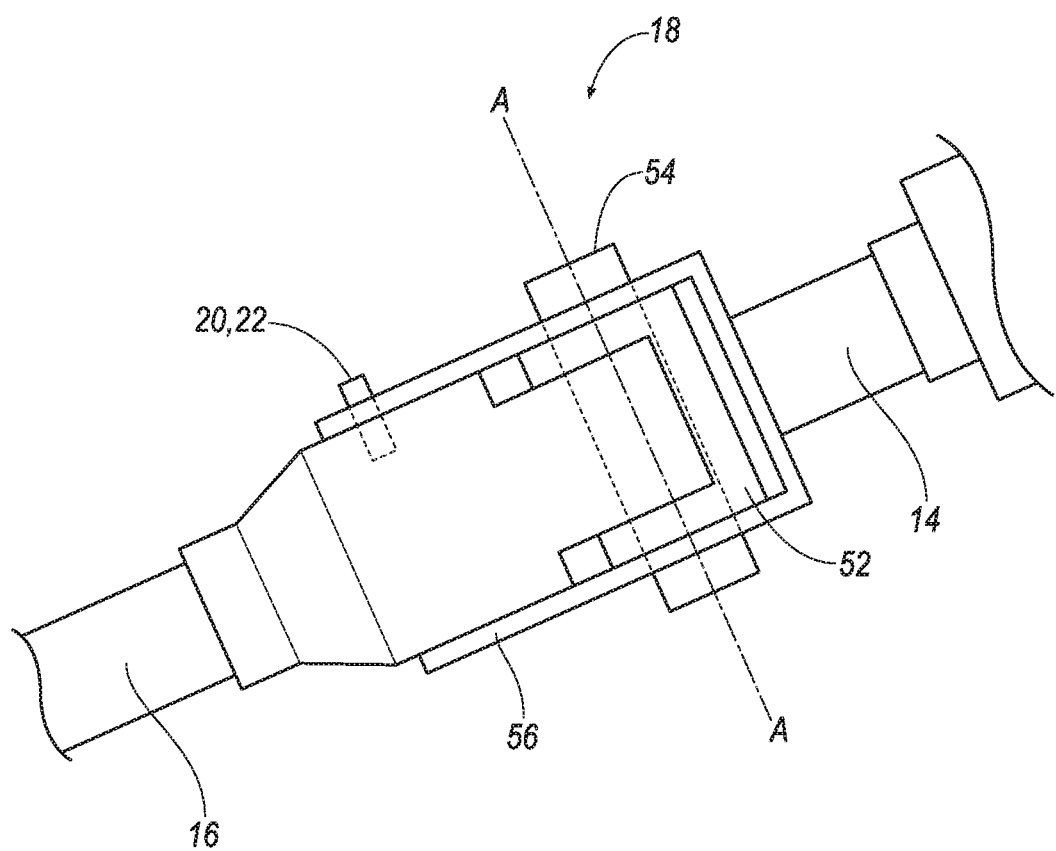
FIG. 1B is a side view of a pivot joint of the assembly.
Figure 2A:
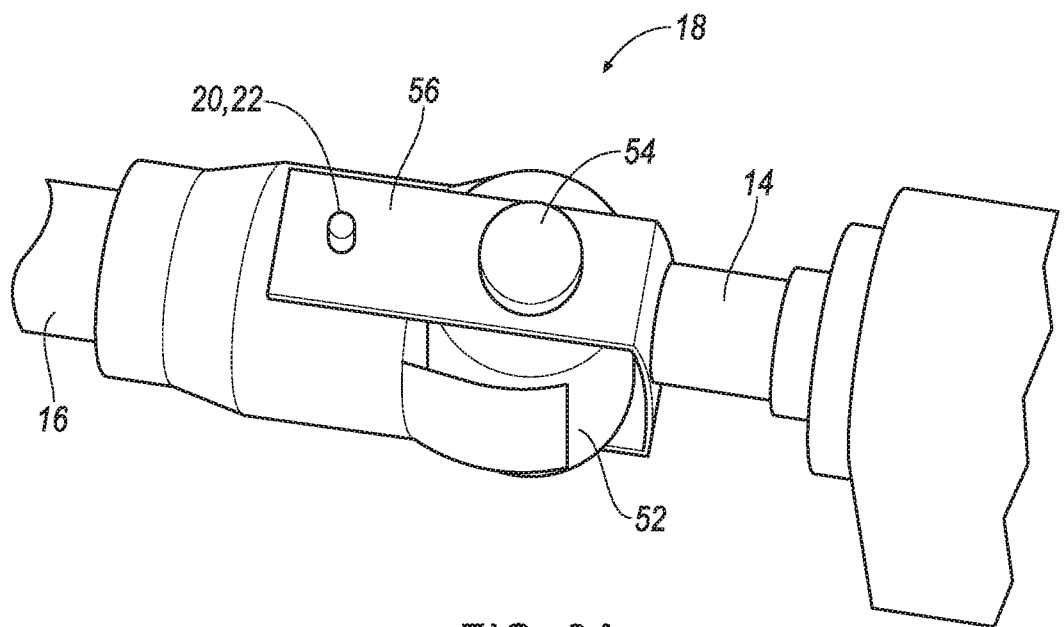
FIG. 2A is a perspective view of the pivot joint with a pin engaging an upper steering shaft and a lower steering shaft.
Figure 2B:
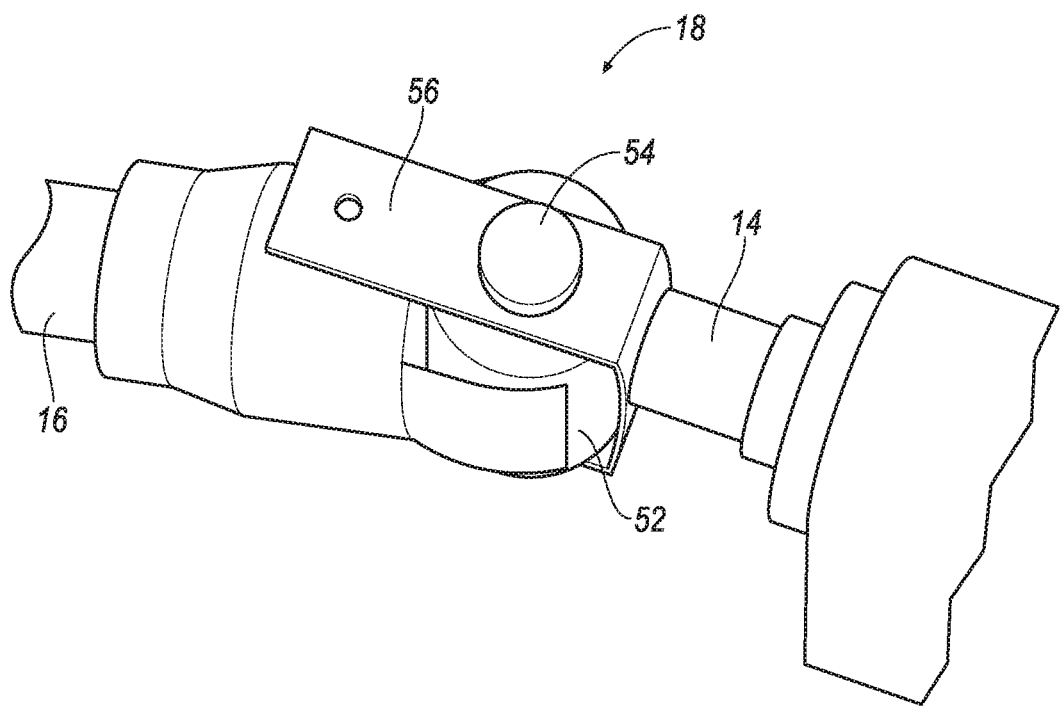
FIG. 2B is a perspective view of the pivot join with the pin released by shear force on the pin allowing the upper steering shaft to pivot relative to the lower steering shaft.

The pin 20 is spaced from the pivot joint 18, e.g., the pin 20 is spaced from the pivot pin 54. The pin 20 is connected to the upper steering shaft 14, i.e., the bracket 56, and the lower steering shaft 16. The pin 20 extends from the lower steering shaft 16 and through the bracket 56 of the upper steering shaft 14. The pin 20 and the pivot pin 54 may be elongated about parallel axes, as shown in FIG. 1B.

The pin 20 is releasable relative to at least one of the upper steering shaft 14 and the lower steering shaft 16. In the examples shown in the Figures, the pin 20 is releasable from the lower steering shaft 16 and remain connected to the upper steering shaft 14.

The assembly 10 is designed to release from at least one of the upper steering shaft 14 and the lower steering shaft 16 when the axis A is generally vertical, i.e., when the steering wheel 38 is generally in the center position, and during a vehicle-oblique impact. In such a scenario, the upper steering shaft 14 is pivotable about the pivot joint 18 relative to the lower steering shaft 16 in the cross-vehicle direction toward the vehicle-oblique impact. More specifically, the assembly 10 may be designed such that, when the pin 20 is released from the lower steering shaft 16, the upper steering shaft 14 is only pivotable about the axis A when the steering wheel 38 is generally in the center position, i.e., can pivot about the axis A when the steering wheel 38 is generally in the center position and prevented from pivoting about the axis A when the steering wheel 38 is generally offset from the center position.

In one example, as shown in FIGS. 1A-2B, the pin 20 is frangible relative to at least one of the upper steering shaft 14 and the lower steering shaft 16 and releases by breaking when force applied to the upper steering shaft 14 exceeds a threshold. In other words, the pin 20 in FIGS. 1A-2B is a shear pin 22. During a vehicle-oblique impact when the steering wheel 38 is generally in the center position, the inertia from the impact breaks the pin 20 to allow the upper steering shaft 14 and the steering wheel 38 to pivot about the axis A in the cross-vehicle direction toward the vehicle-oblique impact. In such an example, the movement of the airbag 42 encourages the head of the occupant to remain engaged with the airbag 42 as the upper steering shaft 14 rotates toward the vehicle-oblique impact and the head of the occupant moves toward the vehicle-oblique impact.

With continued reference to FIGS. 1A-2B, during a vehicle impact that does not generate cross-vehicle inertia on the upper steering shaft 14, the pin 20 remains engaged with both the upper steering shaft 14 and the lower steering shaft 16 due to a lack of rotational force about the pivot joint 18. Similarly, the pin 20 remains engaged with both the upper steering shaft 14 and the lower steering shaft 16 when the steering wheel 38 is generally offset from the center position during any type of vehicle impact. In particular, when the steering wheel 38 is generally offset from the center position, the axis A is offset from vertical. Accordingly, inertia of the upper steering shaft 14 in a cross-vehicle direction, e.g., due to a vehicle-oblique impact, is counteracted by the engagement of the bracket 56 and the bushing 52.

As another example, with reference FIGS. 3 and 4, the pin 20 may be a component of the active release 24 that actively releases the pin 20, e.g., in response to an instruction from the computer 50. In other words, the computer 50 may instruct the active release 24 to release the pin 20 from at least one of the lower steering shaft 16 and the upper steering shaft 14 in response to detection of a vehicle-oblique impact and detection of the steering wheel 38 generally in the center position. The impact sensor 46, as described above, may detect the vehicle-oblique impact. A steering wheel angle sensor 58 in communication with the computer 50, e.g., through the communication network 48, may detect the position of the steering wheel 38, i.e., generally in the center position or generally offset from the center position.

With reference to FIG. 3, as one example of the active release 24, the pin 20 may be a component of the solenoid 26. In such an example, the pin 20 releases when components of the solenoid 26 retract the pin 20 from engagement with the lower steering shaft 16. Specifically, in response to a vehicle-oblique impact and the steering wheel 38 generally in the center position, the computer 50 instructs the solenoid 26 to retract the pin 20 to allow the upper steering shaft 14 to pivot about the axis A. The solenoid 26 maintains engagement of the pin 20 with the upper steering shaft 14 and the lower steering shaft 16 in the absence of both a vehicle-oblique impact and the steering wheel 38 generally in the center position. The solenoid 26 may be of any suitable type including an armature, coil, etc., as is known.

With reference to FIG. 4, as another example of the active release 24, the pin 20 may be a component of a pyrotechnic device 28. In such an example, the pin 20 releases when components of the pyrotechnic device 28 discharge. Specifically, in response to a vehicle-oblique impact and the steering wheel 38 generally in the center position, the computer 50 instructs the pyrotechnic device 28 to discharge to break the pin 20 to allow the upper steering shaft 14 to pivot about the axis A. The pyrotechnic device 28 maintains engagement of the pin 20 with the upper steering shaft 14 and the lower steering shaft 16 in the absence of both a vehicle-oblique impact and the steering wheel 38 generally in the center position. The pyrotechnic device 28 may be of any suitable type including a pyrotechnic charge, an igniter, etc., as is known.

With reference to FIGS. 5A and 5B, when the pin 20 is released from at least one of the upper steering shaft 14 and the lower steering shaft 16, the upper steering shaft 14 may pivot about the pivot joint 18 relative to the lower steering shaft 16, i.e., the upper steering shaft 14 may pivot about the axis A. The upper steering shaft 14 may be pivotable about the pivot joint 18 relative to the lower steering shaft 16 in a cross-vehicle direction toward the vehicle-oblique impact. For example, as shown in FIG. 5A, if the vehicle-oblique impact occurs to the left-hand side of the vehicle 12, the upper steering shaft 14 may rotate toward the left-hand side of the vehicle 12. As shown in FIG. 5B, if the vehicle-oblique impact occurs to the right-hand side of the vehicle 12, the upper steering shaft 14 may rotate toward the right-hand side of the vehicle 12.

In the event of a vehicle-oblique where the pin 20 has been released, the upper steering shaft 14 may be pivotable relative to the lower steering shaft 16 about the pivot joint 18 concurrently with the airbag 42 deploying to the inflated position. Said another way, as the upper steering shaft 14 is pivoting in the cross-vehicle direction toward the vehicle-oblique impact, the airbag 42 is deploying to the inflated position.

The computer 50, implemented via circuits, chips, or other electronic components, is included in the vehicle control system for carrying out various operations, including as described herein. The computer 50 is a computing device that generally includes a processor and a memory, the memory including one or more forms of computer-readable media, and storing instructions executable by the processor for performing various operations, including as disclosed herein. The memory of the computer 50 further generally stores remote data received via various communication mechanisms; e.g., the computer 50 is generally configured for communications on a controller area network (CAN) bus or the like, and/or for using other wired or wireless protocols, e.g., Bluetooth, etc. The computer 50 may also have a connection to an onboard diagnostics connector (OBD-II). Via the communication network 48 using Ethernet, WiFi, the CAN bus, Local Interconnect Network (LIN), and/or other wired or wireless mechanisms, the computer 50 may transmit messages to various devices in the vehicle 12 and/or receive messages from the various devices, e.g., controllers, actuators, sensors, etc.

The computer 50 may be in communication with the communication network 48 of the vehicle 12 to send and/or receive instructions to and from components of the vehicle 12. The computer 50 may be a microprocessor-based controller implemented via circuits, chips, or other electronic components. For example, the computer 50 may include the processor, memory, etc. The memory of the computer 50 may include memory storing instructions executable by the processor as well as for electronically storing data and/or databases.

Figure 6:
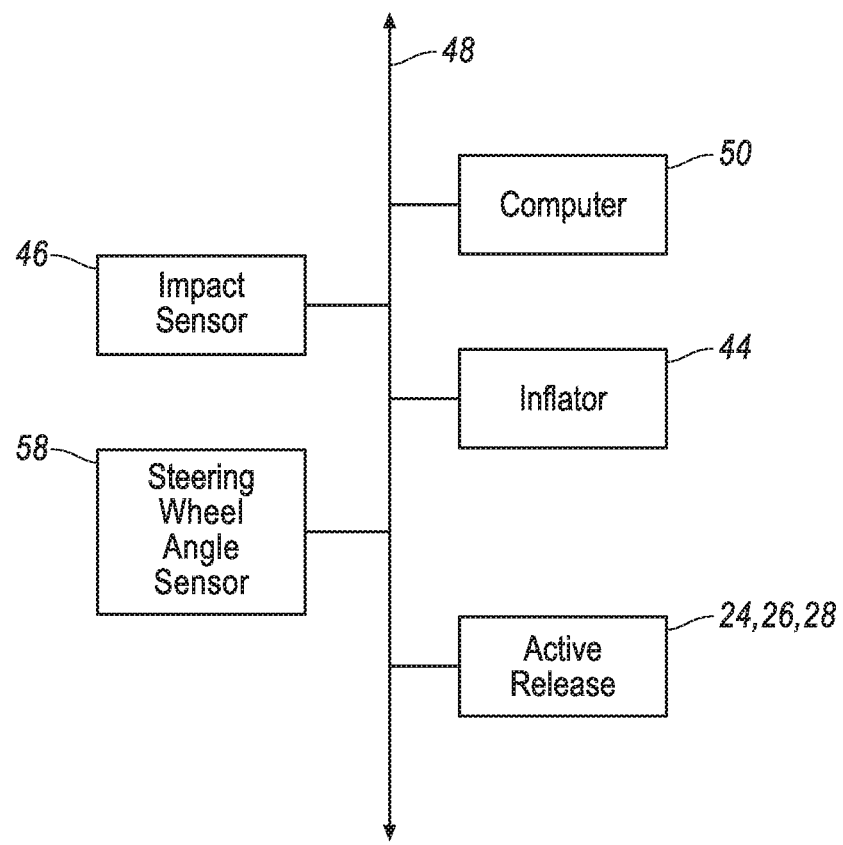
FIG. 6 is a block diagram including electronic components of the vehicle.

As shown in the block diagram in FIG. 6, the communication network 48 includes hardware, such as a communication bus, for facilitating communication among vehicle components. The communication network 48 may facilitate wired or wireless communication among the vehicle components in accordance with a number of communication protocols such as controller area network (CAN), Ethernet, WiFi, Local Interconnect Network (LIN), and/or other wired or wireless mechanisms.

Figure 7:
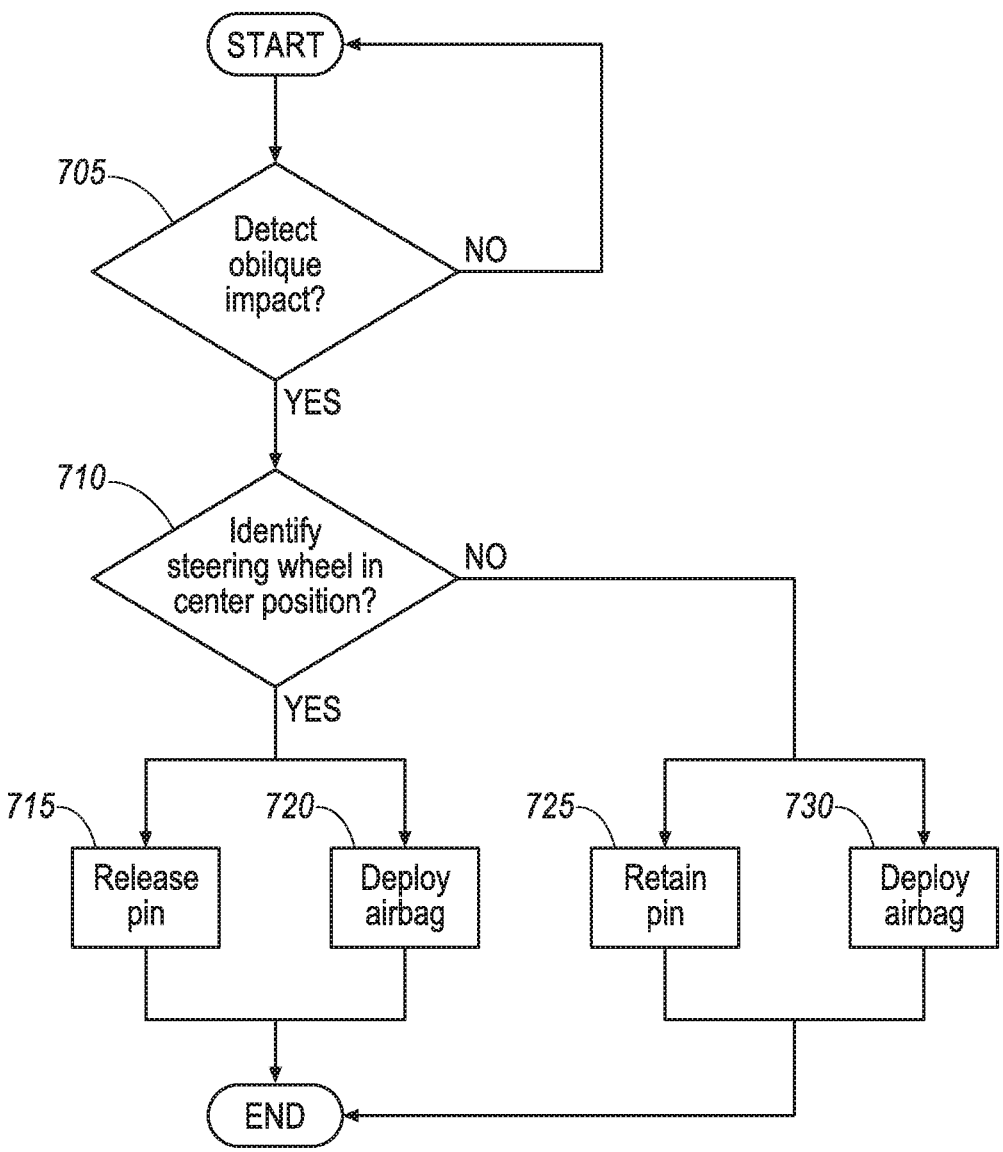
FIG. 7 is a flowchart for the release of a pin in the embodiments of FIGS. 3 and 4.

With reference to FIG. 7, the computer 50 includes the processor and the memory stores instructions executable by the processor to release the pin 20 from at least one of the lower steering shaft 16 and the upper steering shaft 14 in response to a vehicle-oblique impact when the steering wheel 38 is generally in the center position. Specifically, the operation of the active release 24, e.g., the solenoid 26, pyrotechnic device 28, etc., is shown in FIG. 7.

With reference to block 705, the memory stores instructions executable by the processor to receive an impact signal indicating detection of a vehicle-oblique impact from the impact sensor 46.

With reference to block 710, the instructions may include instructions to identify that the steering wheel 38 is generally in the center position. The identification that the steering wheel 38 is generally in the center position may include receiving a steering wheel position signal indicating that the steering wheel 38 is generally in the center position. The steering wheel angle sensor 58 may generate the steering wheel position sensor.

With reference to blocks 715 and 720, the instructions may include instructions to release the pin 20 and deploy the airbag 42 at least in response to the oblique-vehicle impact, i.e., the impact signal, and the steering wheel 38 generally in the center position, i.e., the steering wheel position signal indicating that the steering wheel 38 is generally in the center position.

Specifically, with reference to block 715, the instructions may include instructions to release the pin 20 in response to the impact signal and the steering wheel position signal indicating that the steering wheel 38 is generally in the center position. Specifically, the instructions include instructions to activate the active release 24 to release the pin 20. In one example in which the assembly 10 includes the solenoid 26, the instructions may include instructions to retract the pin 20 of the solenoid 26 at least in response to the oblique-vehicle impact, i.e., the impact signal, and the steering wheel 38 generally in the center position, i.e., the steering wheel position signal indicating that the steering wheel 38 is generally in the center position. As another example in which the assembly 10 includes the pyrotechnic device 28, the instructions may include instructions to discharge the pyrotechnic device 28 to release the pin 20 at least in response to the oblique-vehicle impact, i.e., the impact signal, and the steering wheel 38 generally in the center position, i.e., the steering wheel position signal indicating that the steering wheel 38 is generally in the center position.

With reference to block 720, the instructions may include instructions to deploy the airbag 42 in response to at least the oblique-vehicle impact, i.e. the impact signal. The deployment of the airbag 42 may occur concurrently with the release of the pin 20 in block 715.

With reference to blocks 725 and 730, the instructions may include instructions to deploy the airbag 42 without releasing the pin 20 at least in response to the oblique-vehicle impact and lack of detection of the steering wheel 38 generally in the center position. The lack of detection of the steering wheel 38 generally in the center position may be a detection of the steering wheel 38 generally offset from the center position, e.g., detected by the steering wheel angle sensor 58.

Specifically, with reference to block 725, the instructions may include instructions to retain the pin 20 when the steering wheel 38 is offset from the generally center position. The pin 20 may be retained in the absence of the center position signal.

With reference to block 730, the instructions may include instructions to deploy the airbag 42 in response to at least the oblique-vehicle impact, i.e., the impact signal. The airbag 42 deployment may occur concurrently, in parallel, with retaining the pin 20 in block 725.

The disclosure has been described in an illustrative manner, and it is to be understood that the terminology which has been used is intended to be in the nature of words of description rather than of limitation. Use of "in response to" indicates a causal relationship, not merely a temporal relationship. Many modifications and variations of the present disclosure are possible in light of the above teachings, and the disclosure may be practiced otherwise than as specifically described.

What is claimed is:

1. An assembly comprising:
   an upper steering shaft and a lower steering shaft;

a pivot joint between the upper steering shaft and the lower steering shaft, the upper steering shaft being pivotable in a cross-vehicle direction about the pivot joint; and a pin connected to the upper steering shaft and the lower steering shaft preventing pivoting of the upper steering shaft relative to the lower steering shaft about the pivot joint, the pin being releasable from at least one of the upper steering shaft and the lower steering shaft allowing pivoting of the upper steering shaft relative to the lower steering shaft about the pivot joint.

2. The assembly of claim 1, wherein the pivot joint is pivotable about an axis that is generally vertical.

3. The assembly of claim 1, wherein the pin is spaced from the pivot joint.

4. The assembly of claim 1, wherein the pivot joint is pivotable about an axis and the pin is designed to release from at least one of the upper steering shaft and the lower steering shaft when the axis is generally vertical and during a vehicle-oblique impact.

5. The assembly of claim 4, wherein the upper steering shaft is pivotable about the pivot joint relative to the lower steering shaft in the cross-vehicle direction toward the vehicle-oblique impact.

6. The assembly of claim 1, further comprising an airbag deployable to an inflated position, the upper steering shaft being pivotable relative to the lower steering shaft about the pivot joint concurrently with the airbag deploying to the inflated position.

7. The assembly of claim 1, wherein the upper steering shaft is telescopic.

8. The assembly of claim 1, wherein the pin is frangible relative to at least one of the upper steering shaft and the lower steering shaft.

9. The assembly of claim 1, wherein the pivot joint is pivotable about an axis and the pin is designed to release from at least one of the upper steering shaft and the lower steering shaft when the axis is generally vertical.

10. The assembly of claim 9, wherein the pin is designed to remain connected to the upper steering shaft and the lower steering shaft when the axis is offset from generally vertical.

11. The assembly of claim 10, further comprising a steering wheel connected to the upper steering shaft, the axis being generally vertical when the steering wheel is generally in a center position and the axis being offset from generally vertical when the steering wheel is generally offset from the center position.

12. The assembly of claim 9, further comprising a steering wheel connected to the upper steering shaft, the axis being generally vertical when the steering wheel is generally in a center position.

13. The assembly of claim 1, further comprising:

an active release including the pin; and a computer comprising a processor and a memory storing instructions executable by the processor to retract the pin of the active release at least in response to a vehicle-oblique impact.

14. The assembly of claim 1, further comprising a solenoid including the pin.

15. The assembly of claim 14, further comprising a computer comprising a processor and a memory storing instructions executable by the processor to retract the pin of the solenoid at least in response to a vehicle-oblique impact.

16. The assembly of claim 15, wherein the instructions include instructions to retract the pin of the solenoid at least in response to detection of a steering wheel generally in a center position.

17. The assembly of claim 1, further comprising a pyrotechnic device including the pin.

18. The assembly of claim 17, further comprising a computer comprising a processor and a memory storing instructions executable by the processor to release the pin of the pyrotechnic device at least in response to a vehicle-oblique impact.

19. The assembly of claim 18, wherein the instructions include instructions to release the pin of the pyrotechnic device at least in response to detection of a steering wheel generally in a center position.

20. The assembly of claim 12, wherein the steering wheel is rotatable about a rotational axis between the center position and rotational positions offset from the center position, the axis being offset from generally vertical when the steering wheel is generally offset from the center position.

* * * * *